(12) United States Patent
Kambayashi et al.

(10) Patent No.: US 10,983,051 B2
(45) Date of Patent: Apr. 20, 2021

(54) REACTION SYSTEM AND REACTION METHOD

(71) Applicant: HITACHI, LTD., Tokyo (JP)

(72) Inventors: Takuya Kambayashi, Tokyo (JP); Toshimitsu Noguchi, Tokyo (JP); Shunsuke Kono, Tokyo (JP)

(73) Assignee: HITACHI, LTD., Tokyo (JP)

( * ) Notice: Subject to any disclaimer, the term of this patent is extended or adjusted under 35 U.S.C. 154(b) by 147 days.

(21) Appl. No.: 16/208,432

(22) Filed: Dec. 3, 2018

(65) Prior Publication Data
US 2019/0302017 A1 Oct. 3, 2019

(30) Foreign Application Priority Data
Mar. 28, 2018 (JP) .............................. JP2018-061263

(51) Int. Cl.
*G01N 21/05* (2006.01)
*G01N 21/53* (2006.01)
*G01N 21/01* (2006.01)

(52) U.S. Cl.
CPC .......... *G01N 21/532* (2013.01); *G01N 21/05* (2013.01); *G01N 2021/0193* (2013.01); *G01N 2021/052* (2013.01)

(58) Field of Classification Search
CPC ................. G01N 21/532; G01N 21/05; G01N 2021/0193; G01N 2021/054
See application file for complete search history.

(56) References Cited

U.S. PATENT DOCUMENTS

2004/0142481 A1* 7/2004 Hartlein ................. G01N 21/59
436/164
2009/0150106 A1* 6/2009 Erickson .............. G01N 21/274
702/85

FOREIGN PATENT DOCUMENTS

| JP | H08-271384 A | 10/1996 |
|----|--------------|---------|
| JP | 2001-009268 A | 1/2001 |
| JP | 2002-005943 A | 1/2002 |
| JP | 2009-294002 A | 12/2009 |

(Continued)

OTHER PUBLICATIONS

Notice of Reasons for Refusal for related Japanese Patent Application No. 2018-061263, dated Feb. 9, 2021; English translation provided (8 pages).

*Primary Examiner* — Maurice C Smith
(74) *Attorney, Agent, or Firm* — Procopio, Cory, Hargreaves & Savitch LLP

(57) ABSTRACT

To provide a reaction system capable of analyzing a liquid sample with high accuracy. To provide a reaction system A including: a reaction vessel 1, a flow channel 2 including a deformable unit 22 having an elastic member, a pump 3, a flow channel deformation mechanism 4, a measurement unit 5 and an analysis unit 6, wherein the measurement unit 5 includes a light source unit 52 and a light receiving unit 54, the flow channel deformation mechanism 4 includes an operation unit 42 for deforming the deformable unit 22 of the flow channel 2 such that a cross-sectional area of the deformable unit 22 is reduced, and the analysis unit 6 is electrically or physically connected to the measurement unit 5 and the flow channel deformation mechanism 4, and operates the flow channel deformation mechanism 4 based on a measurement result obtained by the measurement unit 5.

11 Claims, 9 Drawing Sheets

(56) References Cited

FOREIGN PATENT DOCUMENTS

| JP | 2015-102428 A | 2/2015 |
| JP | 2015-021932 A | 6/2015 |

* cited by examiner

[Fig. 1]
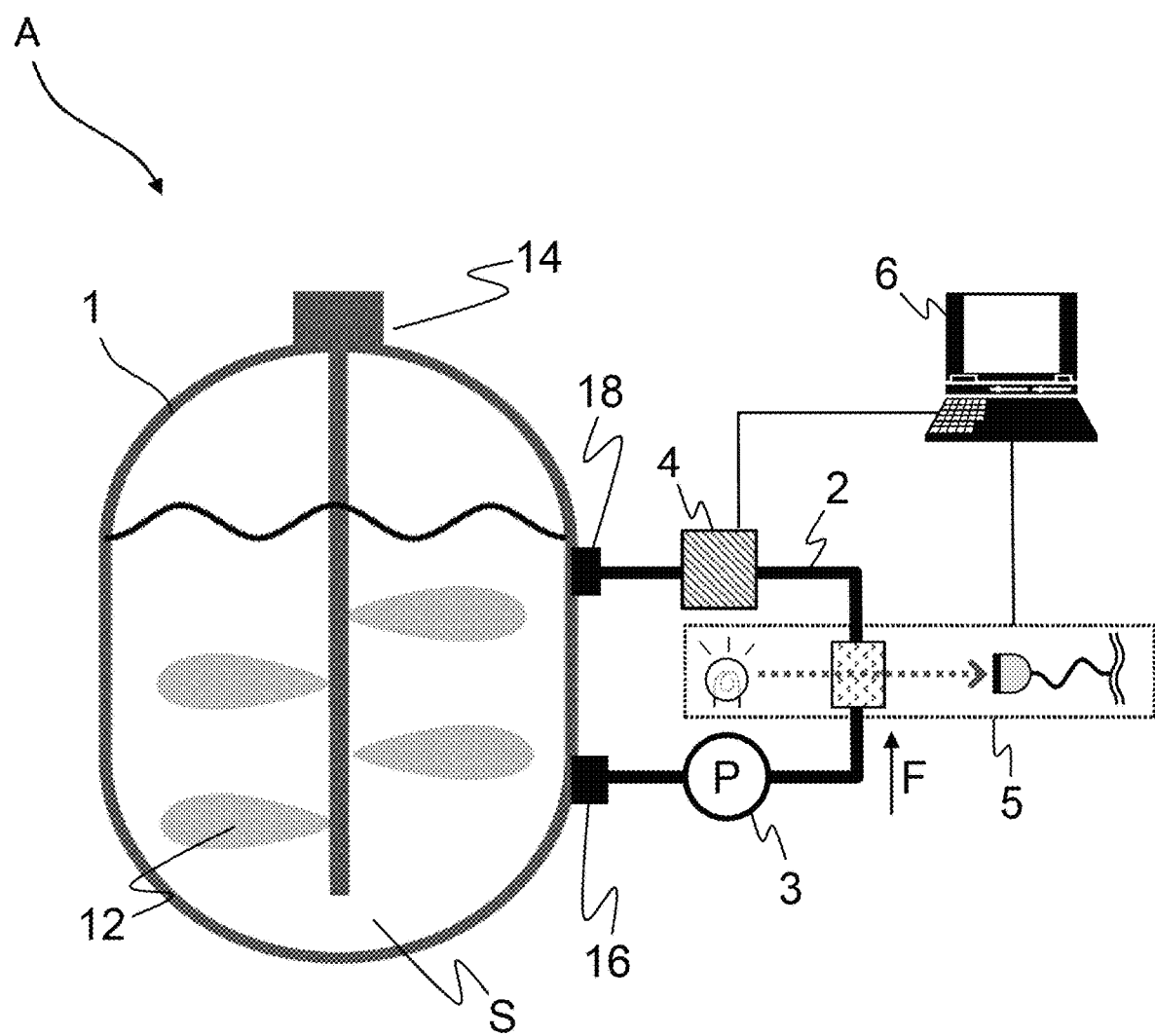

[Fig. 2]
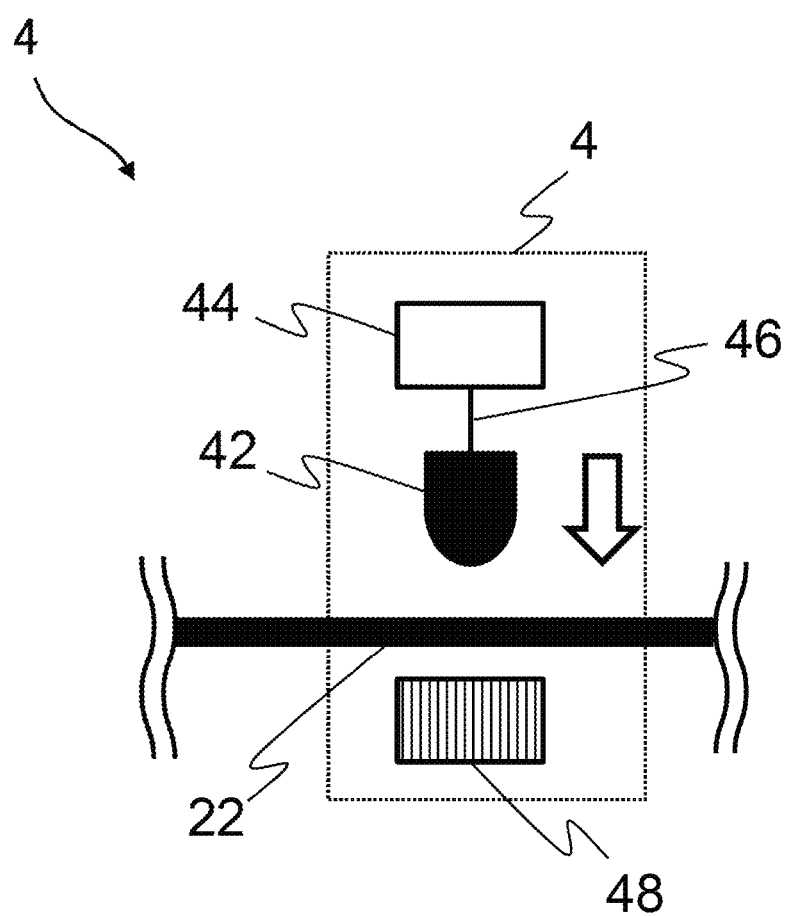

[Fig. 3]
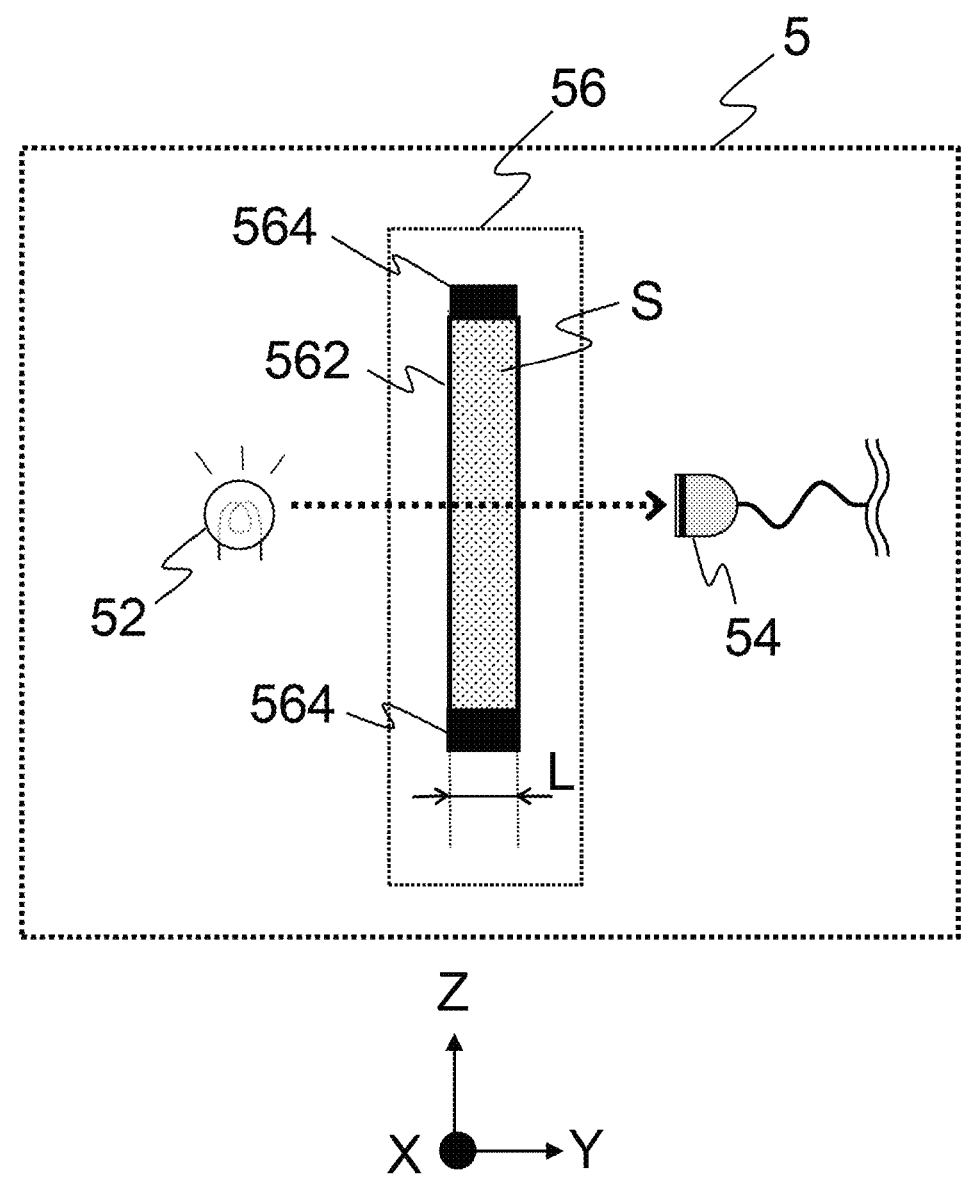

[Fig. 4]
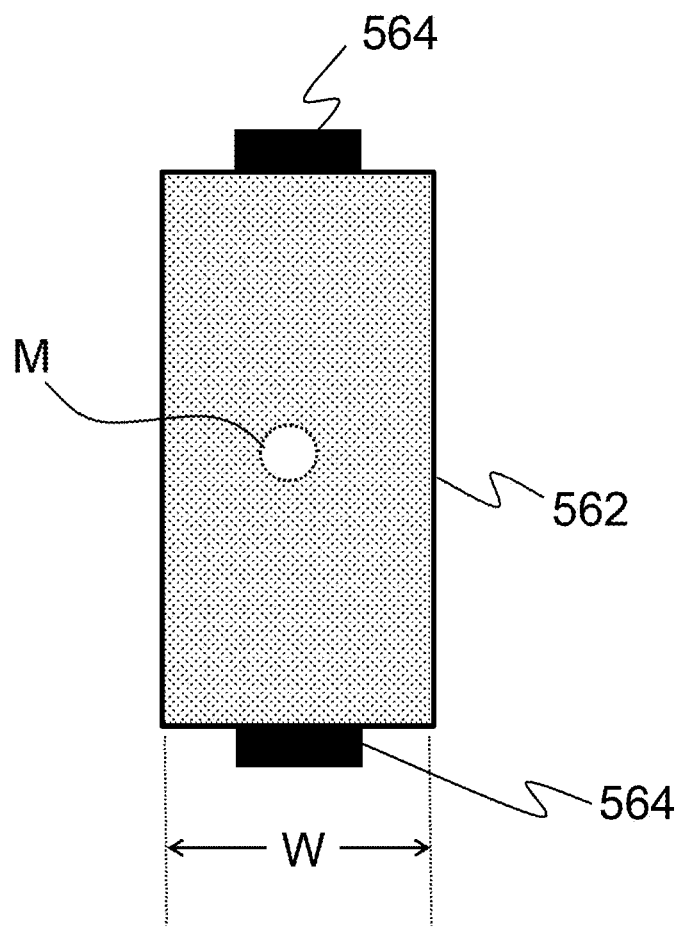

[Fig. 5]
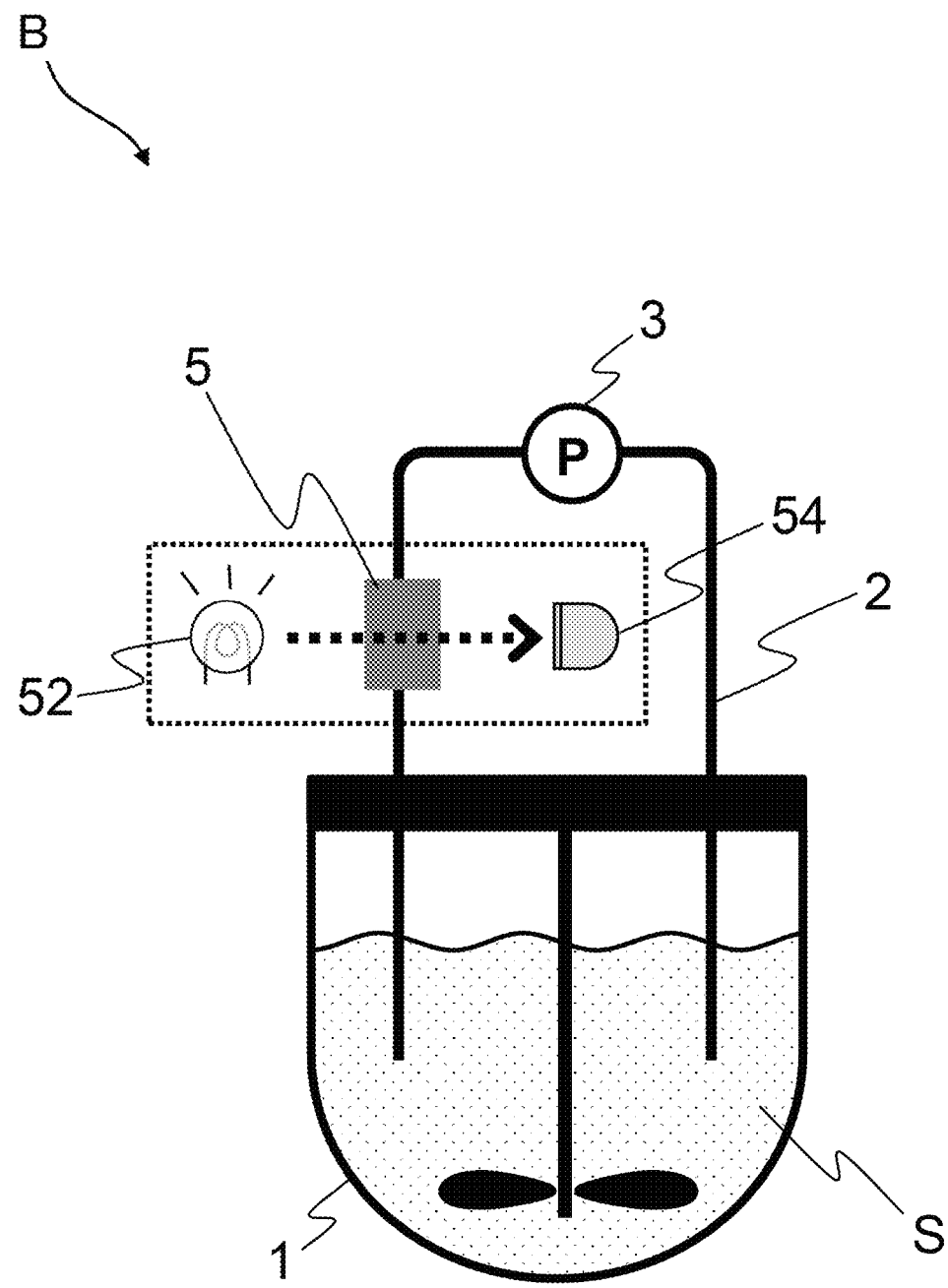

[Fig. 6]
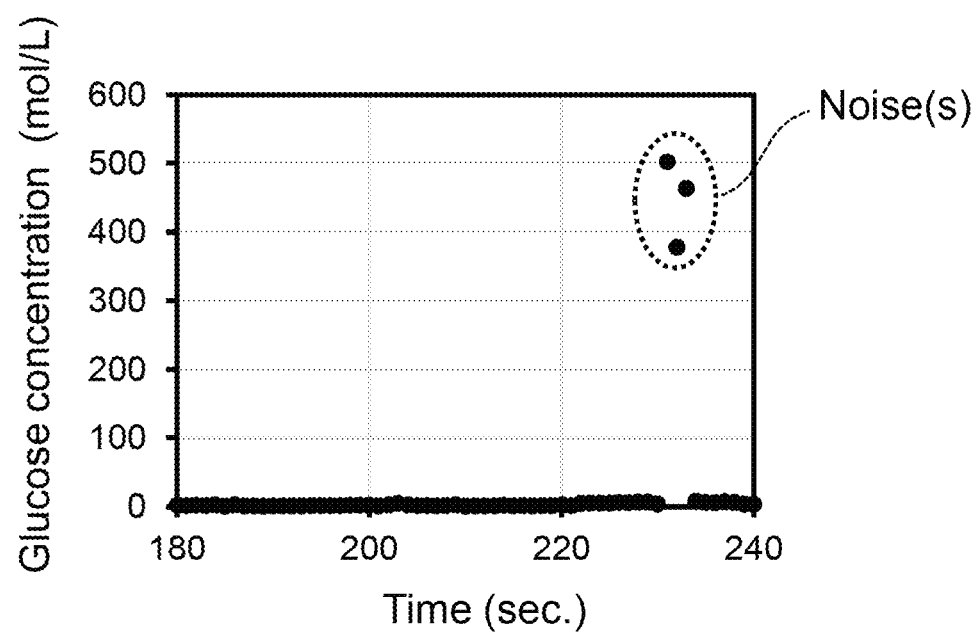

[Fig. 7]
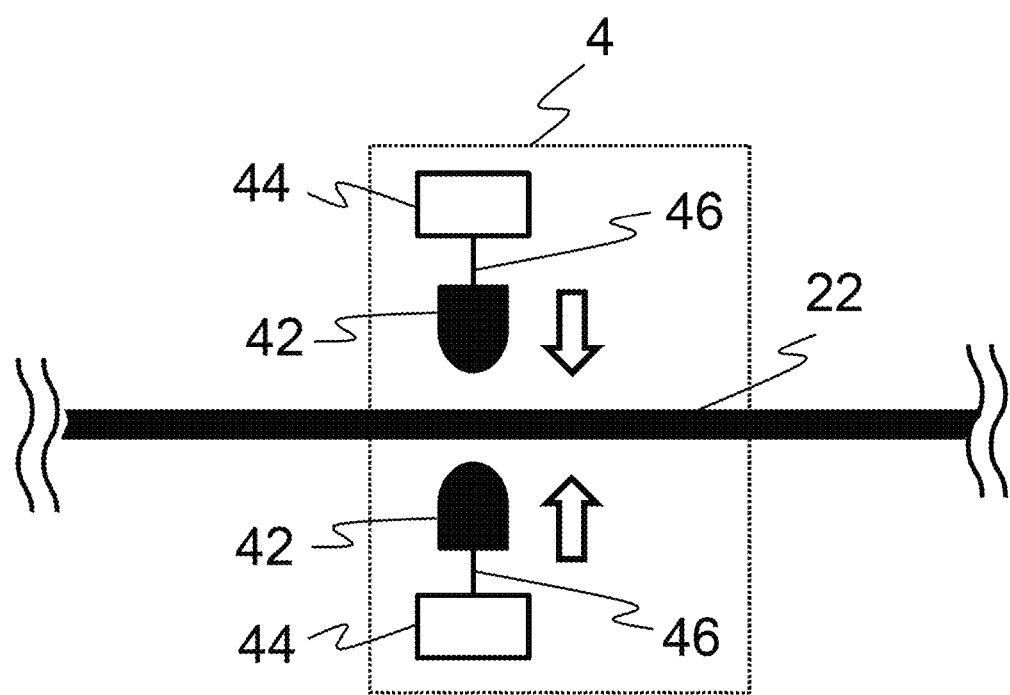

[Fig. 8]
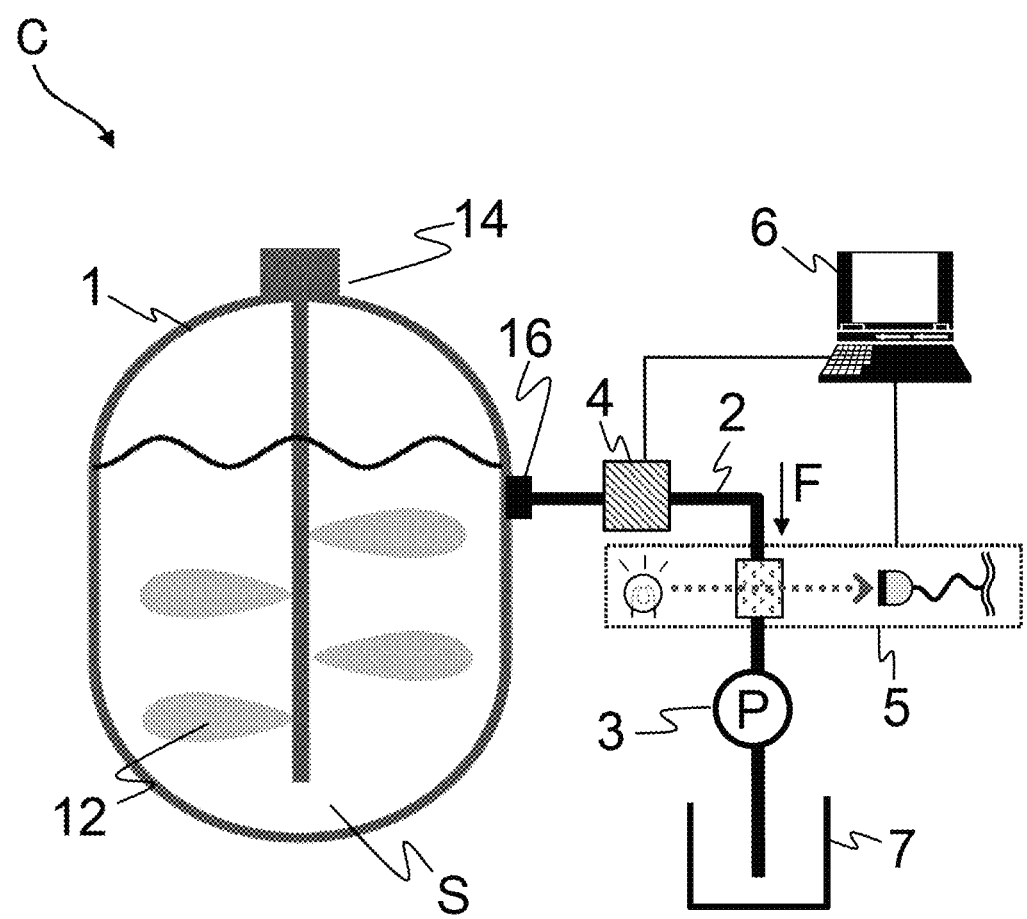

[Fig. 9]
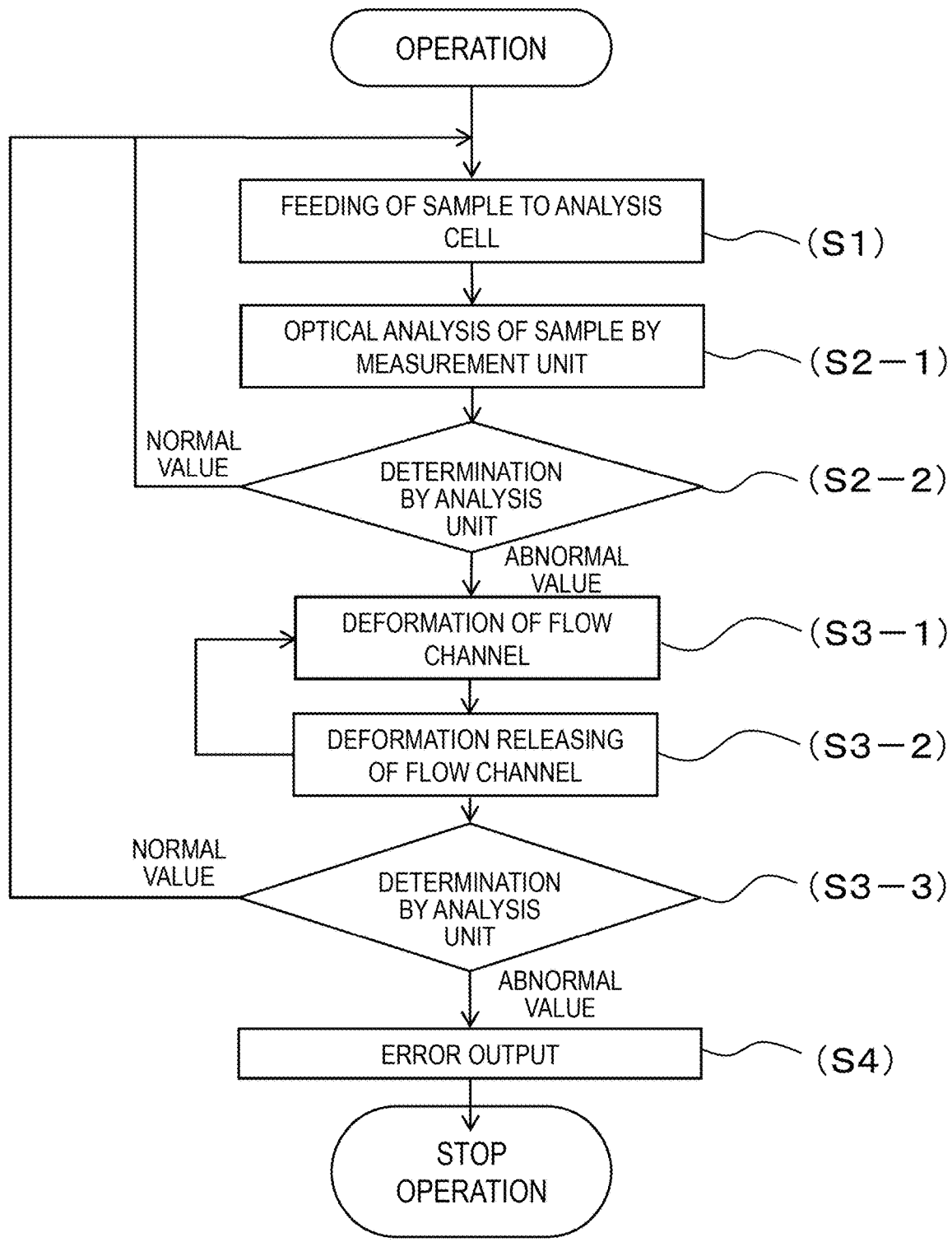

REACTION SYSTEM AND REACTION METHOD

TECHNICAL FIELD

The present invention relates to a reaction system and a reaction method.

BACKGROUND ART

There is a method of irradiating a liquid sample with a light to analyze components contained in the sample. For example, PTL 1 describes that "an in situ X-ray absorption fine structure analyzer of a very small amount of a substance in a solution which is provided with: a reaction unit for uniformly stirring a solution containing a very small amount of a substance and advancing a specific reaction in the solution; a measuring cell having not only an inflow port and an outflow port of the solution but also a storage unit of the solution between the inflow port and the outflow port to keep the uniformity of the solution and having a light receiving window for irradiating the solution in the storage unit with X-rays radiated from an X-ray source; a detection unit capable of detecting the very small amount of the substance in the solution on the spot by detecting fluorescent X-rays radiated from the solution irradiated with the X-rays through the light receiving window; flow channels for allowing the reaction unit and the measuring cell to communicate with each other; and a liquid sending pump for circulating the solution between the reaction unit and the measuring cell both of which are interposed on the way of the flow channels".

PRIOR ART DOCUMENT

Patent Document

PTL 1: JP-A-2009-294002

SUMMARY OF INVENTION

Technical Problem

However, when the above-described analysis is performed while reacting the liquid sample chemically, biologically, or physically, as the reaction proceeds, an atmospheric gas such as air or nitrogen, a gas generated by the reaction, or the like will flow into the sample in the form of air bubbles. Such air bubbles lower analysis accuracy for the sample.

Therefore, an object of the invention is to provide a reaction system and a reaction method capable of analyzing a liquid sample with high accuracy.

Solution to Problem

The present application includes a plurality of means for solving at least a part of the above problems, and examples thereof are as follows.

A first aspect according to the invention is directed to a reaction system including: a reaction vessel configured to contain a liquid sample; a flow channel connected to the reaction vessel and including a deformable unit having an elastic member; a pump configured to feed the sample from the reaction vessel to the flow channel; a flow channel deformation mechanism configured to deform the deformable unit of the flow channel; a measurement unit configured to measure the sample in the flow channel; and an analysis unit configured to analyze a measurement result obtained by the measurement unit, wherein the measurement unit includes a light source unit configured to irradiate the sample with a light and a light receiving unit configured to receive a transmitted light or scattered light of the sample, the flow channel deformation mechanism includes an operation unit configured to deform the deformable unit of the flow channel such that a cross-sectional area of the deformable unit is reduced, and the analysis unit is electrically or physically connected to the measurement unit and the flow channel deformation mechanism, and operates the flow channel deformation mechanism based on the measurement result obtained by the measurement unit.

A second aspect according to the invention is a reaction method including:

(1) a step of flowing a liquid sample contained in a reaction vessel to a measurement unit connected to the reaction vessel;

(2) a step of irradiating the sample in the measurement unit with a light and measuring the sample; and (3) a step of deforming a flow channel, which is connected to the reaction vessel and includes a deformable unit having an elastic member such that a cross-sectional area of the deformable unit of the flow channel is reduced based on a measurement result of the sample, and then releasing the deformation.

Advantageous Effect

According to the invention, a liquid sample can be analyzed with high accuracy.

Problems, configurations and effects other than the above will be apparent with reference to the description of embodiments below.

BRIEF DESCRIPTION OF DRAWINGS

FIG. 1 shows an example of a reaction system according to the present embodiment.

FIG. 2 shows a configuration of a flow channel deformation mechanism of FIG. 1.

FIG. 3 is a front view of a measurement unit of FIG. 1.

FIG. 4 is a side view of the measurement unit of FIG. 1.

FIG. 5 shows a configuration of a reaction system used for verification.

FIG. 6 is a graph showing a result of the verification.

FIG. 7 shows a configuration of another example of the flow channel deformation mechanism.

FIG. 8 shows another example of the reaction system according to the present embodiment.

FIG. 9 is a flowchart of an example of a reaction method according to the present embodiment.

DESCRIPTION OF EMBODIMENTS

Hereinafter, embodiments of the invention (hereinafter simply referred to as "the present embodiment") will be described in detail. The embodiments below are merely examples for describing the invention and the invention is not intended to be limited to those embodiments. In the following embodiments, the description may be divided into each embodiment if necessary for convenience. However, unless specifically indicated, these embodiments are not independent with each other, but are in a relationship in which one is a modification, a detailed and supplementary description, or the like of a part or all of the other.

In the following embodiments, in a case where a number and the like (including a number, a numeric value, an amount, a range and the like) of an element are mentioned, the number is not limited to specific numbers, and may be greater or less than the specific numbers, unless specifically indicated or unless the number is clearly limited to the specific numbers in principle. Further, in the following embodiments, constituent elements thereof (including elements step and the like) are not absolutely essential unless specifically indicated or unless clearly considered to be essential in principle.

Similarly, in the following embodiments, when shapes, position relationships, etc. of the constituent elements and the like are mentioned, substantially approximate and similar shapes, etc. are included, unless specifically indicated or clearly excluded in principle. The same also applies to the numeric value and the range described above.

Further, in all the drawings for explaining the embodiments, in principle, the same members are denoted by the same reference numerals, and repetitive descriptions thereof are omitted. To make a drawing easy to understand, hatching is sometimes applied to the drawing even in a plan view. For the sake of understanding, an orthogonal coordinate system with an X axis, a Y axis, and a Z axis may be used, the X axis and the Y axis are directions forming a horizontal plane, and the Z axis is perpendicular to the horizontal plane, unless otherwise specified. A change within a range in which substantially the same functional effect can be achieved is permitted even if the change does not coincide strictly with each axis.

<Reaction System>

A first aspect of the present embodiment is a reaction system.

FIG. 1 shows an example of the reaction system according to the present embodiment. FIG. 2 shows a configuration of a flow channel deformation mechanism of FIG. 1. FIG. 3 is a front view of a measurement unit of FIG. 1. FIG. 4 is a side view of the measurement unit of FIG. 1.

A reaction system A according to the present embodiment includes: a reaction vessel 1 for containing a liquid sample S; a flow channel 2 connected to the reaction vessel 1 and including a deformable unit 22 having an elastic member; a pump 3 for feeding the sample S from the reaction vessel 1 to the flow channel 2; a flow channel deformation mechanism 4 for deforming the deformable unit 22 of the flow channel 2; a measurement unit 5 for measuring the sample S in the flow channel 2; and an analysis unit 6 for analyzing a measurement result obtained by the measurement unit 5. The measurement unit 5 includes a light source unit 52 for irradiating the sample S with a light and a light receiving unit 54 for receiving a transmitted light or scattered light of the sample S. The flow channel deformation mechanism 4 includes an operation unit 42 for deforming the deformable unit 22 of the flow channel 2 such that a cross-sectional area of the deformable unit 22 is reduced. The analysis unit 6 is electrically or physically connected to the flow channel deformation mechanism 4 and the measurement unit 5, and operates the flow channel deformation mechanism 4 based on the measurement result obtained by the measurement unit 5. Detail explanation will be given below.

The reaction system A can analyze the sample S in the reaction vessel with high accuracy by the measurement unit 5 without stopping the reaction. In addition, the sample S can be continuously analyzed, an over-time variation of the reaction in the reaction vessel 1 can be observed, and the analysis can be performed without damaging, consuming, or losing the sample S.

The kind of the sample S is not limited as long as the sample S is a liquid. For example, the sample S may be a solution in which a solute and a solvent are homogeneously mixed, a suspension in which solid particles are dispersed in a solvent, an emulsion containing oil droplets or the like, and a colloidal liquid, or the like. There may be a plurality of components constituting the liquid sample S. When the sample S is composed of a plurality of components, the sample S is in a liquid state, or at least one of the components is a liquid phase. For example, the sample S may be a combination of: liquid phase-liquid phase; liquid phase-solid phase; liquid phase-gas phase; liquid phase-solid phase-gas phase; or the like. The viscosity of the sample S is not particularly limited as long as the fluidity of the sample S allows the sample S to be fed as a liquid.

Specific examples of the sample S include a culture solution of cells, microorganisms, fungi or the like for performing a biological reaction, and various chemicals and solvents for performing a chemical reaction. However, the culture solution of cells, microorganisms, fungi or the like for performing a biological reaction is preferable.

The reaction vessel 1 rotates a stirring blade 12 by a power unit 14 to stir the sample S. First, the sample S is fed from a discharge port 16 of the reaction vessel 1 to the flow channel 2 by the pump 3 provided in the flow channel 2. The sample S fed to the flow channel 2 is returned from a supply port 18 back to the reaction vessel 1 via the pump 3, the measurement unit 5, and the flow channel 2. A feeding direction of the sample S is not particularly limited, and from the viewpoint of discharging air bubbles, the sample is preferably fed upward from below in the flow channel 2 (see an arrow F in the FIG. 1).

The supply port 18 for the sample S to return to the reaction vessel 1 may be positioned below a liquid surface of the sample S in the reaction vessel 1 (see FIG. 1), or may be positioned above the liquid surface. That is, the sample S measured by the measurement unit 5 may be supplied from below the liquid surface of the reaction vessel 1 or may be supplied from above. From the viewpoint of suppressing the formation of air bubbles, the sample is preferably supplied from below the liquid surface.

Here, as the reaction vessel, the reaction vessel 1 is illustrated that applies a mechanical flow to the sample S by rotating the stirring blade 12, but the reaction vessel 1 is not limited to having the stirring blade 12. The reaction vessel 1 may be any vessel capable of storing the sample S, and the shape of a main body is not limited. For example, a tubular reaction vessel such as a static mixer may be used.

The sample S fed to the measurement unit 5 is optically analyzed in an analysis cell 56 in the measurement unit 5 (see FIG. 3 and FIG. 4). The measurement unit 5 includes the analysis cell 56, the light source unit 52 for irradiating the sample S in the analysis cell 56 with light, and the light receiving unit 54 for receiving transmitted light or scattered light of the sample S. The analysis cell 56 includes a passage unit 562 through which the sample S passes, and connection units 564 connected to the flow channel 2. Each connection unit 564 is connected to the flow channel 2.

A light is emitted from the light source unit 52 toward a measuring position M (see FIG. 4) of the passage unit 562. The light receiving unit 54 receives the transmitted light or scattered light of the sample S present at the measuring position M. The light irradiation is not limited to a spot irradiation towards the measuring position M, and for example, the spot may be scanned in the passage unit 562. The light receiving unit 54 may extract the received transmitted light or scattered light as an electrical signal.

A structure of the analysis cell 56 is not particularly limited, and for example, a structure having at least one pair of transparent surfaces facing to each other can be used. The position relationship between the light source unit 52, the analysis cell 56, and the light receiving unit 54 is not particularly limited as long as the light emitted from the light source unit 52 is configured to pass through the sample S in the analysis cell 56 or scatter and to be capable of being received by the light receiving unit 54.

The analysis unit 6 is electrically or physically connected to the flow channel deformation mechanism 4 and the measurement unit 5. For example, the analysis unit 6 is configured by a computer, and the computer is electrically connected to the flow channel deformation mechanism 4 and the measurement unit 5 (see FIG. 1). For example, the computer can be configured to control operation of the flow channel deformation mechanism 4 based on a measurement result obtained by the measurement unit 5.

The kind of the analysis method performed by the measurement unit 5 is not particularly limited. Examples include an optical analysis as described above, in which the sample S is irradiated with light and the transmitted light or scattered light is received to be analyzed. Specific examples thereof include an infrared spectroscopic analysis, a near-infrared spectroscopic analysis, an ultraviolet-visible spectroscopic analysis, a fluorescence spectroscopic analysis, a phosphorescence spectroscopic analysis, an X-ray analysis, or the like. Other examples thereof include: various kinds of spectroscopic analyses for measuring the intensity of the transmitted light obtained by irradiating the sample S with light; various kinds of light scattering spectroscopic analyses for measuring the intensity of the scattered light obtained by irradiating the sample S with light; and various kinds of photoelectron spectroscopic analyses for measuring the energy of photoelectrons emitted from the sample S irradiated with light.

The transmitted light and the scattered light (unless otherwise specified, a reflected light is also included in the specification.) handled in the present embodiment include, for example, a light to be measured in the various spectroscopic analyses described above.

When the above-described optical analyses are performed, a suitable light source unit 52 and a suitable light receiving unit 54 can be employed according to the kind, measurement conditions, or the like of the spectroscopic analysis used. As the light source unit 52, for example, a device capable of irradiating an infrared light, a near infrared light, an ultraviolet light, a visible light, an excitation light, an X-rays, or the like can be used. As the light receiving unit 54, for example, a detector capable of detecting the light to be measured or the like can be used. Specific examples of the light receiving unit 54 include, for example, a device provided with an InGaAs photodiode, an InSb photoconductive element, a PbS photoconductive element, a photomultiplier tube, a Si photodiode, or the like.

A wavelength of the light absorbed differs depending on kinds of components contained in the sample S. By utilizing this fact, the kinds of the components in the sample S can be specified by analyzing the light received by the light receiving unit 54. Alternatively, an amount of the light absorbed differs depending on concentrations of the components contained in the sample S. By utilizing this fact, the concentrations of the components in the sample S can be obtained by fixing a length of an optical path. For example, in a case of FIG. 3, an interval (L) between facing surfaces of the passage unit 562 is the length of the optical path.

When the liquid sample S is chemically, biologically, or physically reacted in a reaction vessel, there is a problem that air bubbles will remain in the sample S over time. For example, when stirring the sample S in the reaction vessel, an atmospheric gas (such as air or an inert gas such as nitrogen or argon) or a gas generated by the reaction is involved in the sample S, so that the air bubbles are contained in the sample S. Then, the sample S containing the air bubbles is fed to the measurement unit 5 or other parts via the flow channel 2. As a result, the air bubbles adhere to the passage unit 562 of the analysis cell 56 (see, for example, FIG. 3 and FIG. 4). Then, the transmitted light or scattered light to be measured in the passage unit 562 is influenced by the air bubbles, and the obtained analysis result includes not only information on the sample S but also information on the air bubbles. As a result, the analysis accuracy of the sample S is reduced.

Here, the influence of air bubble generation on the analysis is verified in detail.

FIG. 5 shows a configuration of a reaction system used for verification.

A reaction system B includes a circulation system in which a reaction tank including the stirring blade 12 is connected to the flow channel 2, and a sample is fed to the measurement unit 5 by the pump 3. The measurement unit 5 includes a quartz cell for performing a spectroscopic analysis. A light is irradiated from the light source unit 52 to the quartz cell of the measurement unit 5 and is received by the light receiving unit 54, so that the spectroscopic analysis is performed. A solution in which glucose is dissolved in pure water was used as the sample S, and a near infrared light (wavelength: 1 μm to 2.5 μm) was irradiated as a measurement light. At this time, a glucose concentration was measured by varying the glucose concentration in a range of 0 to 10 mol/L while stirring the sample S, and performing a near-infrared spectroscopic analysis thereon. The glucose concentration was measured using a calibration model prepared using a model sample having a known glucose concentration.

FIG. 6 is a graph showing a result of the verification. In a near-infrared light region, the absorbance of the air bubbles and the absorbance of the glucose tend to differ greatly. Therefore, it was confirmed from the graph of FIG. 6 that when the air bubbles adhere to the analysis cell, noise caused by the bubbles was detected.

In view of the above, when such noise is detected in the reaction system A according to the present embodiment (see FIG. 1), since the air bubbles contained in the sample S in the flow channel 2 can be discharged to the outside by operating the flow channel deformation mechanism 4, it can be said that the reaction system A can remove or suppress such noise. Specifically, after the deformable unit 22 of the flow channel 2 is deformed, a restoring force derived from the elastic material of the deformable unit 22 is generated by releasing the deformation. A flow rate of the sample S in the flow channel 2 is temporarily increased by the restoring force, and the air bubbles can be discharged to the outside in this way. As a result, the sample S can be analyzed with high accuracy.

A driving unit 44 of the flow channel deformation mechanism 4 operates the operation unit 42 via a transmission unit 46 to deform the flow channel 2. In the flow channel deformation mechanism 4, first the driving unit 44 is driven to move the operation unit 42 downward via the transmission unit 46 (see the arrow in FIG. 2). The operation unit 42 sandwiches the deformable unit 22 of the flow channel 2 with a support unit 48 and thereby the deformable unit 22 is deformed such that a cross-sectional area of the deformable unit 22 is reduced. Then, a deformed state of the deformable unit 22 is held for a given time (for example, 10 seconds). Since the deformed deformable unit 22 has a narrowed flow channel width, the flow rate of the sample S flowing therethrough is reduced. On the other hand, since the pump 3 continues to feed the sample S, the pressure in the flow channel 2 rises. After a given time, the drive unit 44 restores the operation unit 42 back to the initial position. Accordingly, the deformed state of the deformable unit 22 is released, a restoring force is generated in the deformable unit 22, and the flow channel width of the deformable unit 22 tends to return to the initial width at once. Then, the internal pressure of the flow channel 2 is released at once, and the flow rate of the sample S increases. As the flow rate of the sample S increases, a large fluid resistance force is temporarily applied to the air bubbles contained in the sample S and the air bubbles adhering to the vicinity of the passage unit 562. As a result, the air bubbles are discharged.

The deformable unit 22 is made from an elastic material. The kind of the elastic material is not particularly limited, and a suitable material can be selected by considering the kind of the sample S, the device configuration, or the like. Specific examples of the elastic material include various rubber materials including silicone rubber or the like. By using the elastic material, the restoring force after releasing the deformation can be applied to the deformable unit 22.

A method of deforming the deformable unit 22 of the flow channel 2 by the operation unit 42 is not particularly limited, and can be, for example, a method using bending or pressing. Among the methods, it is preferable that the operation unit 42 presses the deformable unit 22 of the flow channel 2 to deform the deformable unit 22. By adopting the method of deforming the deformable unit 22 by pressing, a high restoring force can be generated in the deformable unit 22 by releasing the deformation without damaging the flow channel 2.

The number and configuration of each member in the flow channel deformation mechanism 4 are not particularly limited, and can be appropriately selected by considering the device configuration or the like.

FIG. 7 shows a configuration of another example of the flow channel deformation mechanism.

For example, the flow channel deformation mechanism 4 may be configured to press the deformable unit 22 by only one operation unit 42 (see FIG. 2), or may be configured to press the deformable unit 22 by two operation units 42 provided facing to each other, and to clamp the deformable unit 22 between the two operation units (see FIG. 7).

The reaction system according to the present embodiment can feedback the measurement result obtained by the measurement unit 5 to the analysis unit 6. In particular, the measurement unit 5 extracts the transmitted light or scattered light of the sample S received by the light receiving unit 54 as a signal, and the analysis unit 6 determines whether the signal is a normal value or an abnormal value. When it is determined that the signal indicates an abnormal value, it is preferable that the flow channel deformation mechanism 4 deforms the deformable unit 22 of the flow channel 2 for a predetermined time such that the cross-sectional area of the deformable unit 22 is reduced.

Further, when the signal does not restore to a signal indicating a normal value after repeating the deformation and the release of the deformation by the flow channel deformation mechanism 4 for a predetermined number of times (for example, three times), it is more preferable that the analysis unit 6 is configured to output an error. The error may be displayed on a display or the like, or may be output as a sound, for example.

When the analysis unit 6 detects a signal (noise signal) caused by the air bubbles from the analysis result in the analysis cell 56, the analysis unit 6 provides an operation signal for the flow channel deformation mechanism 4 to deform the flow channel 2. Upon receiving the operation signal, the flow channel deforming mechanism 4 repeats a series of operations to deform the flow channel for a predetermined time and then release the deformation for a predetermined number of times. Meanwhile, the measurement unit 5 continuously performs optical analysis on the sample S in the analysis cell 56 and sends the result to the analysis unit 6.

When the analysis unit 6 determines that the noise signal disappears from the analysis result of the measurement unit 5 and the signal restores to a signal indicating a normal value, the analysis unit 6 issues a command to the flow channel deformation mechanism 4 to stop the repetitive operations (deformation-deformation releasing). On the other hand, when the analysis unit 6 determines that the noise signal does not disappear from the analysis result even after the flow channel deformation mechanism 4 is operated for a predetermined number of times, it is judged that the signal does not restore to a signal indicating a normal value, and the analysis unit 6 outputs an error.

As shown in FIG. 1, in the reaction system A according to the present embodiment, the reaction vessel 1 includes the discharge port 16 for discharging the sample S and the introduction port 18 for introducing the sample S measured by the measurement unit 5, and the flow channel 2 is connected to the discharge port 16 and the introduction port 18. In this case, since the system is a circulation system and the measured sample S can be returned back to the reaction vessel 1 via the flow channel 2, the sample S may be reused. For example, when the analysis system is operated for a long time at a large scale, the amount of the measured sample S is large, so that an economic advantage of being capable of reusing the sample S is also large.

Alternatively, the reaction system according to the present embodiment may further include a storage tank 7 which is connected to a downstream of the measurement unit 5 and stores the sample S measured by the measurement unit 5.

FIG. 8 shows a configuration of another example of the flow channel deformation mechanism.

In a reaction system C, the reaction vessel 1 includes the stirring blade 12 for stirring the sample S, the power unit 14 for rotating the stirring blade 12, the discharge port 16 connected to the flow channel 2, and the storage tank 7 for storing the sample S is provided at the downstream of the measurement unit 5 (see an arrow F in FIG. 8). In this case, the measured sample S is not returned to the reaction vessel 1 but is stored in the storage tank 7 outside the system. Thereafter, the sample S may be discharged collectively when a certain amount is reached. Since the sample S analyzed by the measurement unit 5 is discharged out of the system without returning to the reaction vessel 1, there is no concern that the sample S in the reaction vessel 1 will be influenced even if the discharged sample S is deteriorated due to the analysis.

<Reaction Method>

A second aspect of the present embodiment is a reaction method.

The reaction method according to the present embodiment includes:

(1) a step of flowing a liquid sample S contained in a reaction vessel 1 to a measurement unit 5 connected to the reaction vessel 1;

(2) a step of irradiating the sample S in the measurement unit 5 with a light and measuring the sample S; and (3) a step of deforming a flow channel 2, which is connected to the reaction vessel 1 and includes a deformable unit 22 having an elastic member such that a cross-sectional area of the deformable unit 22 of the flow channel 2 is reduced based on a measurement result of the sample S, and then releasing the deformation.

The air bubbles present in the sample S can be effectively discharged out of the system by performing such a reaction method, so that the noise caused by the bubbles can be removed or reduced, and the reaction result can be analyzed with high accuracy.

In the step (2), it is preferable that the sample S in the measurement unit 5 is irradiated with a light, and the transmitted light or scattered light thereof is received and extracted as a signal.

Further, in the step (3), it is determined whether the signal is a normal value or an abnormal value, and when it is determined that the signal is an abnormal value, it is preferable that the deformable unit 22 of the flow channel 2 is deformed for a predetermined time, and then the deformation is released. Subsequently, when the signal does not restore to a signal indicating a normal value after deforming the deformable unit 22 of the flow channel 2 for a predetermined time and releasing the deformation, it is preferable that an error is output. The error is output, and the reaction in the reaction vessel 1 may be stopped.

Furthermore, in the step (3), the method of deforming the deformable unit 22 of the flow channel 2 is not particularly limited, and can be, for example, a method of deforming by bending or pressing. Among the methods, from the viewpoint of effectively discharging the air bubbles, it is preferable that the deformable unit 22 of the flow channel 2 is pressed to deform the deformable unit 22.

The reaction method according to the present embodiment preferably further includes a step (4-1) of returning the sample S measured by the measurement unit 5 back to the reaction vessel 1. In this case, since the method is a reaction method of the circulation system, the measured sample S can be reused in the reaction.

Alternatively, the reaction method according to the present embodiment preferably further includes a step (4-2) of discharging the sample S measured by the measuring unit 5 out of the reaction system. In this case, the measured sample S is discharged to the outside via a drain or the like. The measured sample S may be stored in a storage tank 7 and discharged collectively when a certain amount is reached.

FIG. 9 is a flowchart of an example of the reaction method according to the present embodiment. Preferred examples of the reaction method according to the present embodiment include a method of performing the following processes using the reaction system A shown in FIG. 1.

(S1) Feeding of Sample to Analysis Cell:

The pump 3 feeds the liquid sample S in the reaction vessel 1 to the measurement unit 5.

(S2-1) Optical Analysis of Sample by Measurement Unit:

The light source unit 52 irradiates the sample S with a light, and the light receiving unit 54 receives the transmitted light or scattered light thereof, extracts the transmitted light or scattered light as a signal, and outputs the signal to the analysis unit 6.

(S2-2) Determination of Analysis Result by Analysis Unit:

The analysis unit 6 determines whether the received signal is a normal value or an abnormal value. When it is determined that the signal is an abnormal value, a command is issued to drive the flow channel deformation mechanism 4.

(S3-1) Deformation of Flow Channel:

The flow channel deformation mechanism 4 drives the operation unit 42 to deform the deformable unit 22 of the flow channel 2 for a predetermined time (for example, 10 seconds).

(S3-2) Releasing of Deformation of Flow Channel:

The flow channel deformation mechanism 4 moves the operation unit 42 to the initial position to release the deformation of the deformable unit 22 of the flow channel 2.

(S3-3) Determination of Analysis Result by Analysis Unit:

After performing (S3-1) and (S3-2) for a predetermined number of times (for example, three times), the analysis unit 6 determines whether the received signal is a normal value or an abnormal value. When it is determined that the value is a normal value, the process returns to (S1), and the measurement unit 5 continuously analyzes the sample S again.

(S4) Error Output:

When the analysis unit 6 determines that the value is an abnormal value, the analysis unit 6 outputs an error and stops the operation of the reaction vessel 1.

As a mode for implementing the method according to the present embodiment, for example, a mode using a program for causing a computer to perform each of the steps described above can be used. Alternatively, a mode using a computer readable recording medium storing the program for causing a computer to perform each of the steps described above can be used.

Each of the steps described above can be implemented by using a control device. For example, a terminal such as a personal computer can be used as the control device. Although not shown in the drawings, the terminal can include, for example, a central processing unit (CPU), a storage device, an interface for communicating with a main memory, or the like. Various functions of the control device can be stored in the storage device as application programs or the like. The CPU can read the application programs from the storage device, stores the programs in the main memory, and executes the programs to implement the various functions.

The function of performing the optical analysis by the control device can be implemented by, for example, an application program. Further, the control device may be configured to send a command to the reaction vessel 1 for performing the reaction, the pump 3 for feeding the sample S, the flow channel deformation mechanism 4, the measurement unit 5, and the analysis unit 6, respectively. Furthermore, the control device may receive a separate operation of a user, may have a function of displaying an analysis result or an error of the optical analysis to the user, or may notify the user by a sound. The analysis unit 6 can be implemented by such a control device.

The invention made by the present inventor is described above in detail based on the embodiments, but the invention is not limited to the above embodiments, and various changes can be made within the scope not departing from the gist of the invention. For example, although an example in which components contained in the sample are analyzed by the spectroscopic analysis based on the absorption phenomenon of light has been mainly described in the examples, a method of analyzing other physical property values such as a refractive index of the sample may also be used as the analysis method.

REFERENCE SIGN LIST

1: reaction vessel
2: flow channel
3: pump
4: flow channel deformation mechanism
5: measurement unit
6: analysis unit
7: storage tank
12: stirring blade
14: power unit
16: discharge port
18: introduction port
22: deformable unit
42: operation unit
44: drive unit
46: transmission unit
48: support unit
52: light source unit
54: light receiving unit
56: analysis cell
562: passage unit
564: connection unit
A, B, C: reaction system
M: measurement position
S: sample

The invention claimed is:

1. A reaction system, comprising:
a reaction vessel configured to contain a liquid sample;
a flow channel connected to the reaction vessel and including a deformable unit having an elastic member;
a pump configured to feed the sample from the reaction vessel to the flow channel;
a measurement unit configured to measure the sample in the flow channel, the measurement unit includes a light source unit configured to irradiate the sample with a light and a detector configured to receive a transmitted light or scattered light of the sample,
a computer electrically or physically connected to the measurement unit, the computer configured to:
drive a structure in a first direction toward the deformable unit of the flow channel to deform the deformable unit of the flow channel such that a cross-sectional area of the deformable unit is reduced, and analyze a measurement result obtained by the measurement unit,
wherein the computer is configured to drive the structure based on the measurement result obtained by the measurement unit.

2. The reaction system according to claim 1, wherein
the reaction vessel includes a discharge port configured to discharge the sample and an introduction port configured to introduce the sample measured by the measurement unit, and
the flow channel is connected to the discharge port and the introduction port.

3. The reaction system according to claim 1, further comprising:
a storage tank connected downstream of the measurement unit and storing the sample measured by the measurement unit.

4. The reaction system according claim 1, wherein
the measurement unit extracts the transmitted light or scattered light of the sample received by the detector as a signal,
the computer determines whether the signal is a normal value or an abnormal value, and, when it is determined that the signal indicates an abnormal value and drives the structure to deform the deformable unit of the flow channel for a predetermined time such that the cross-sectional area of the deformable unit is reduced.

5. The reaction system according to claim 4, wherein
when the signal does not restore to a signal indicating a normal value after repeatedly driving the structure, the computer is configured to output an error.

6. A reaction method, comprising:
(1) a step of flowing a liquid sample contained in a reaction vessel to a measurement unit connected to the reaction vessel;
(2) a step of irradiating the sample in the measurement unit with a light and measuring the sample; and
(3) a step of deforming a flow channel, which is connected to the reaction vessel and includes a deformable unit having an elastic member such that a cross-sectional area of the deformable unit of the flow channel is reduced based on a measurement result of the sample, and then releasing the deformation.

7. The reaction method according to claim 6, further comprising:
(4-1) a step of returning the sample measured by a detector of the measurement unit back to the reaction vessel.

8. The reaction method according to claim 6, further comprising:
(4-2) a step of discharging the sample measured by the measuring unit out of the reaction system.

9. The reaction method according to claim 6, wherein
in the step (2), the sample in the measurement unit is irradiated with a light, and a transmitted light or scattered light thereof is extracted as a signal; and
in the step (3), it is determined whether the signal is a normal value or an abnormal value, and when it is determined that the signal is an abnormal value, the deformable unit of the flow channel is deformed for a predetermined time, and then the deformation is released.

10. The reaction method according to claim 9, wherein
in the step (3), an error is output when the signal does not restore to a signal indicating a normal value after the deformable unit of the flow channel for the predetermined time is deformed and the deformation is released.

11. The reaction method according to claim 6, wherein in the step (3), the deformable unit of the flow channel is pressed to deform the deformable unit.

* * * * *